United States Patent
Schäty

[19]

[11] Patent Number: 6,158,935
[45] Date of Patent: Dec. 12, 2000

[54] CONSTRUCTIONAL UNIT WITH WELD STUD AND CAP

[75] Inventor: Harald Schäty, Wetzlar, Germany

[73] Assignee: Emhart Inc., Newark, Del.

[21] Appl. No.: 09/301,801

[22] Filed: Apr. 29, 1999

[30] Foreign Application Priority Data

May 5, 1998 [DE] Germany .............................. 198 20 046

[51] Int. Cl.⁷ .................................................. F16B 37/06
[52] U.S. Cl. ........................... 411/171; 411/431; 411/429; 29/235; 29/426.4; 29/426.6
[58] Field of Search .......................... 411/429–431, 435, 411/377, 171; 29/235, 426.4, 426.6

[56] References Cited

U.S. PATENT DOCUMENTS

| | | |
|---|---|---|
| 2,688,185 | 9/1954 | Brazil . |
| 3,000,097 | 9/1961 | Hartz . |
| 3,273,441 | 9/1966 | Biesecker . |
| 4,472,097 | 9/1984 | Kiefer . |
| 4,799,842 | 1/1989 | Kreider ................................... 411/171 |
| 4,875,817 | 10/1989 | Suzumura . |

*Primary Examiner*—Flemming Saether
*Attorney, Agent, or Firm*—Edward D. Murphy

[57] ABSTRACT

For removing a cap (2) made of a plastic material, which is disposed on a shank (9) of a metal stud, it is proposed that the cap has tool engagement regions (15a, 15b), through which a substantially tangentially directed deformation force (F) is introduced by means of jaws (20, 21) into the cap (2) so that at least one portion (14a, 14b, 14c), which extends at least over part of the axial length of the shank (9) and is formed between the tool engagement regions (15a, 15b), is plastically deformed in such a way that the cap (2) releases the shank (9) and the cap (2) may be pulled off in axial direction of the shank (9).

10 Claims, 1 Drawing Sheet

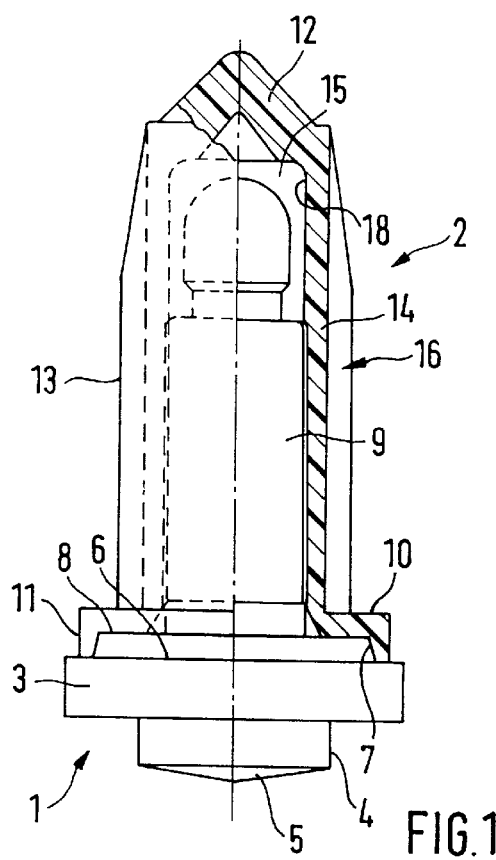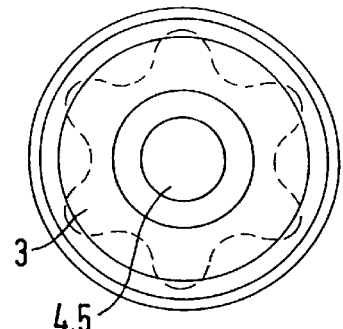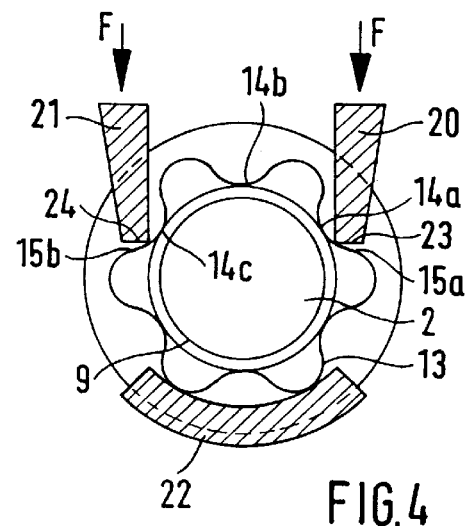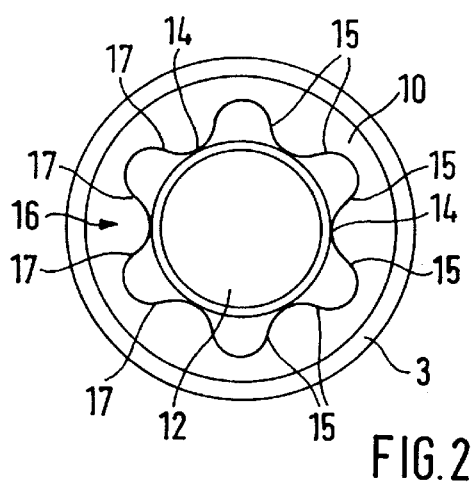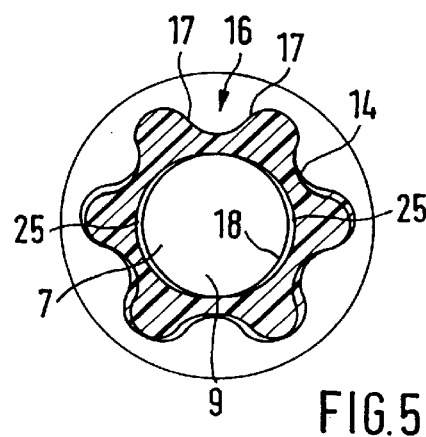

CONSTRUCTIONAL UNIT WITH WELD STUD AND CAP

BACKGROUND OF THE INVENTION

The invention relates to a constructional unit comprising a metal weld stud, which has a shank covered by a plastic cap, to a method of removing a cap from the shank of a metal weld stud as well as to a device for effecting the method.

A constructional unit comprising a metal weld stud and a plastic cap is known from U.S. Pat. No. 4,799,842. The weld stud has a region which is adjoined by a shank -of a smaller diameter so as to form a step. A cap is disposed up to contact with the step on the shank. The cap has a surface.

Such a weld stud may be welded to a component, the stud welding being effected by a known welding device, in particular a welding gun, which by means of clamping jaws grasps the weld stud at its region between the shoulder and the end face to be welded.

The cap performs the function of protecting the shank from possible external influences when a structure, to which the weld stud has been welded, is subjected to further treatment or machining stages. Such a weld stud may form, for example, a grounding stud on a body of a motor vehicle.

During painting of the vehicle body, the cap remains fitted on the weld stud. Once painting has been effected, the cap may be removed from the weld stud, with the result that the shank is not coated with paint. From U.S. Pat. No. 4,799,842, it is known for the cap to be unscrewed from the shank, which has a thread. To said end, the cap has radially projecting wings.

A further construction of a constructional unit comprising a metal weld stud and a cap is known from German Utility Model G 94 13 406.5. In the case of said constructional unit also, the cap is unscrewed from the shank of the weld stud. To said end, the cap has a tool engagement region on its outer surface.

SUMMARY OF THE INVENTION

The object of the present invention is to develop the known constructional unit in such a way that removal of a cap from the weld stud is simplified. A further object of the invention is to indicate a method of removing a cap from a weld stud which is easy to effect. A further object of the invention is to indicate a device for removing a cap from a weld stud, which is of a simple design and easy to operate.

The constructional unit according to the invention comprises a metal weld stud having a region, which is adjoined by a shank of a smaller diameter so as to form a step, and having a plastic cap, which is fastened up to contact with the step on the shank and has a surface. The cap has at least one plastically deformable portion extending at least over part of the axial length of the shank. The plastically deformable portion is formed between two tool engagement regions. At least one of the tool engagement regions it is possible to introduce into the cap a substantially tangentially directed deformation force, by means of which at least one portion is deformed. By virtue of at least one portion being deformed by the deformation force, the cap at least partially releases the shank so that the cap may be pulled in axial direction of the shank off said shank without a particularly high expenditure of force being required for said purpose.

Optionally, the cap may be designed in such a way that the at least one portion extends over the entire axial length of the shank so that, after the portion has been deformed, the cap rests loosely on the shank. By virtue of the deformation of the at least one portion, an increase in the internal cross section of the cap is achieved so that an, in particular, frictional connection between the cap and the shank is canceled. The cap may be disposed of after its removal from the shank.

By virtue of the embodiment according to the invention of the constructional unit, it is no longer necessary for the cap to be unscrewed, as is required according to prior art. The deformation of the cap and the axial removal of the cap from the shank may be carried out faster than an unscrewing of the cap from the shank of the weld stud.

To facilitate the positioning of a device for exerting a deformation force, it is proposed that the cap has tool engagement regions arranged in pairs, the tool engagement regions of each pair being formed diametrically opposite one another. Said advantageous development of the constructional unit has the added advantage of simplifying manufacture of the cap. When the diametrically opposed tool engagement regions are at an identical distance from a longitudinal axis of the shank, this also has the advantage that substantially no torques are introduced into the shank during exertion of a deformation force, with the result that a weld joint between the weld stud and a structure is subjected to no, or only a very low, torsional load.

According to yet another advantageous embodiment of the constructional unit, it is proposed that at least one portion is formed by a weakening of the material of the surface. This has the advantage that it is possible to dispense with additional measures for forming the plastically deformable portion.

In particular, it is proposed that the at least one portion is formed by at least one indentation, in particular a groove or slot, in the surface. Said indentation may be achieved by a corresponding embodiment of the form tool for manufacturing the cap from plastic material. As a result, economical manufacture of a cap is possible.

According to a further advantageous embodiment of the constructional unit according to the invention, it is proposed that the indentation has walls, which at least partially form a tool engagement region. It is therefore possible to dispense with additional measures for forming at least one tool engagement region.

By virtue of the embodiment according to the invention of the constructional unit, it is also possible for a cap to be removed from a shank having an external thread, on which the cap has been screwed. Unscrewing of the cap is not necessary.

According to a further advantageous embodiment of the constructional unit according to the invention, it is proposed that the constructional unit is made of a thermal plastic material. A thermal plastic material has the advantage of being already plastically deformable under the effect of a relatively low force. The thermal plastic material, from which the cap is made, is preferably also stable at higher temperatures so that the cap remains stable also during heat treatment, in particular during a drying process in a paint shop.

According to a further inventive idea, a method of removing a cap made of a plastic material, which is disposed on a shank of a metal weld stud having a region adjoined by the shank of smaller diameter so as to form a step, is proposed. The method is notable for the fact that a substantially tangentially directed deformation force is introduced into the cap and plastically deforms at least one portion, which extends at least over part of the axial length of the shank and is formed between at least two tool engagement regions, in such a way that the cap releases the shank, and the cap is pulled off in axial direction of the shank. Said procedure according to the invention for removing a cap enables simple and timesaving removal of a cap from a shank of a metal weld stud.

According to an advantageous development of the method, it is proposed that an abutment is applied against the cap so that the weld stud during exertion of the deformation force is substantially free of forces and torque. The effect achieved by said advantageous development of the method is that a weld joint between a structure and the weld stud is subjected to no, or only very slight, loading during the process of deformation of the cap.

According to yet another advantageous embodiment of the method, it is proposed that through two tool engagement regions in each case a substantially tangentially directed deformation force is introduced into the cap, the respective deformation force being so selected that the sum of the torques about the longitudinal axis of the shank is substantially zero. Said procedure is advantageous particularly when the tool engagement regions are formed asymmetrically relative to a longitudinal axis of the shank. The deformation forces are directed in a substantially identical manner.

According to a further inventive idea, a device for effecting a method is proposed, which comprises two jaws disposed at a distance from and alongside one another. Each jaw has a contact face which may be brought into contact with the respective tool engagement region of the cap. At least one of the jaws is movable to and fro and connected to an operating unit, by means of which the jaw exerts a deformation force upon the cap.

According to a further advantageous embodiment of the device according to the invention, it is proposed that at least one abutment is provided opposite to and at a distance from the contact faces of the jaws, which abutment via the cap supports the shank of the weld stud.

Further details and advantages of the constructional unit according to the invention, of the method and of the device are described with reference to the embodiment illustrated in the drawings.

BRIEF DESCRIPTION OF THE DRAWINGS

FIG. 1 is a constructional unit in partial section;

FIG. 2 is the constructional unit according to FIG. 1 in a plan view;

FIG. 3 is the constructional unit in an inverted plan view;

FIG. 4 is the constructional unit according to FIG. 1 in a plan view with jaws and abutment; and FIG. 5 is the constructional unit in a plan view and in section after deformation of the cap.

DETAILED DESCRIPTION OF THE INVENTION

FIGS. 1 to 3 show a preferred embodiment of a constructional unit. The constructional unit comprises a weld stud 1. The weld stud 1 has a cylindrical region 3 which is to be grasped by clamping jaws of a welding apparatus, in particular of a stud welding gun. Adjoining the cylindrical region 1 is a short mandrel 4 which, with its conical projection 5, forms a subsequent weld point.

The cylindrical region 1 is adjoined firstly by a step 6, emanating from which is a bevel 7, which verges into a shoulder 8. Adjoining the shoulder 8 is a shank 9. A cap 2 is fastened on the shank 9.

The cap 2 has a continuation 12 used for centering purposes inside a stud welding apparatus, in the manner known from German Utility Model G 94 13 406.5. The cap at its open end verges into a radially outwardly directed rim 10. The rim 10 is adjoined by a lip 11. The lip 11 is placed over the bevel 7. The lip 11 is preferably stretched by the bevel 7 so that the bevel 7 and the lip 11 form a seal. Dirt, dust and other foreign matter are thereby prevented from penetrating into the cap 2.

The cap 2 has plastically deformable portions 14. The plastically deformable portions 14 extend in the illustrated embodiment over the entire length of the shank 9 of the weld stud 1. It is evident from FIG. 2 that one portion 14 is formed between each two tool engagement regions 15. The cap 2 has tool engagement regions 15 arranged in pairs. The tool engagement regions 15 of each pair are disposed diametrically opposite one another.

Each portion 14 is formed by weakening the material of the surface 13 of the cap 2. The portions 14 are formed by indentations 16. Each indentation 16 has walls 17. Each wall 17 forms a tool engagement region 15.

In the illustrated embodiment, the shank 9 is of a cylindrical design. The shank 9 has a smooth surface. An inner surface 18 of the cap 2 is also of a corresponding design. The cross section of the shank 9 and the cross section of the socket 19, in which the shank 9 is disposed, are tuned to one another in such a way as to produce a fit, in particular an interference fit, between the shank 9 and the cap 2.

There now follows a description with reference to FIGS. 4 and 5 of removal of the cap 2 from the shank 9 of the weld stud 1.

FIG. 4 shows the constructional unit according to FIG. 1 in a plan view. FIG. 4 further shows jaws 20, 21 and an abutment 22 of a device for removing the cap 2.

The jaws 20, 21 are disposed at a distance from and alongside one another. Each jaw 20, 21 has a contact face 23, 24. The jaw 20 lies with its contact face 23 against the tool engagement region 15a of the cap 2. The jaw 21 lies with contact face 24 against the tool engagement region 15b. The tool engagement regions 15a and 15b form a diametrically opposed pair.

Formed between the tool engagement regions 15a and 15b, viewed in peripheral direction, are three sections 14a, 14b and 14c.

The abutment 22 is provided opposite the contact faces 23, 24 of the jaws 20, 21. The abutment 22 rests against part of the surface 13 of the cap 2.

The jaws 20, 21 are movable to and fro substantially at right angles to the longitudinal extension of the cap 2.

For positioning the device for removing the cap, the jaws 20, 21 are retracted into an inoperative position so that the clear cross section between the jaws 20, 21 and the abutment is large enough to enable the cap 2 to be grasped by the device. The jaws 20, 21 are then moved in the direction of the abutment 22 until the contact faces 23, 24 are applied against the tool engagement regions 15a, 15b. Upon a further movement of the jaws 20, 21 in the direction of the abutment 22, the jaws 20, 21 introduce into the cap 2 a deformation force, by means of which the portions 14a, 14b and 14c are at least partially deformed. The deformation of the portions 14a, 14b and 14c effects an increase in the cross section of the socket 19.

FIG. 5 shows the cap 2 after deformation of the portions 14a, 14b and 14c. The reference character 25 denotes a gap which has arisen between the inner surface 18 of the cap 2 and the shank 9. As a result of the increase in the cross section of the socket 18, the connection between the cap 2 and the shank 9 has been at least partially canceled. The cap may be pulled off the shank 9 in axial direction of said shank by means of the device. Once the cap 2 has been pulled off, the jaws 20, 21 release the cap so that it may drop preferably automatically under the effect of a gravitational force. The jaws 20, 21 adopt their starting position.

I claim:

1. A constructional unit comprising:

a metal weld stud having a region which is adjoined by a shank of a smaller diameter so as to form a step;

a cap which is coupled to the step on the shank and has an outer surface wherein the cap, has at least one plastically deformable portion, which extends at least over part of the axial length of the shank and is formed between two tool engagement regions the tool engagement regions being capable of introducing into the cap a substantially tangentially directed deformation force, by means of which at least one of said plastically deformable portions is deformed.

2. A constructional unit according to claim 1 wherein the tool engagement regions are arranged in pairs, each pair being disposed diametrically opposite one another.

3. A constructional unit according to claim 1 characterized in that at least one of said plastically deformable portions is formed by a weakening of the material of the outer surface.

4. A constructional unit according to claim 3, characterized in that at least one of said plastically deformable portions is formed by at least one indentation, in paticular, a groove or a slot, in the outer surface.

5. A constructional unit according to claim 4, characterized in that the indentation has walls which at least partially form the tool engagement region.

6. A constructional unit according to claim 1, characterized in that the shank has an external thread and the cap is screwed on the shank.

7. A constructional unit according to claim 1 characterized in that the cap is made of a thermoplastic material.

8. A method of removing a cap made of plastic material, which is disposed on a shank of a metal weld stud comprising the steps of: providing a metal weld stud having a shank of a first diameter; which is adjoined by a region of a larger diameter so as to form a step; providing a cap coupled to said stud having at least one plastically deformable portion which extends at least over part of the axial length of the shank and is formed between tool engagement regions; applying a substantially tangentially directed deformation force into at least one engagement region and plastically deforming at least one of said plastically deformable portions in such a way that the cap releases the shank and the cap is pulled off in axial direction of the shank.

9. A method according to claim 8, wherein an abutment is applied against the cap so that the weld stud during exertion of the deformation force is substantially free of forces and torque.

10. A method according to claim 8, wherein through two tool engagement regions in each case a substantially tangentailly directed deformation force is introduced into the cap the respective deformation force being so selected that the sum of the torques about the longitudinal axis of the shank is substantially zero.

* * * * *